United States Patent
Borkenhagen et al.

(10) Patent No.: US 7,251,185 B2
(45) Date of Patent: Jul. 31, 2007

(54) METHODS AND APPARATUS FOR USING MEMORY

(75) Inventors: John M. Borkenhagen, Rochester, MN (US); Sudhir Dhawan, Austin, TX (US); Philip R. Hillier, III, Rochester, MN (US); Joseph A. Kirscht, Rochester, MN (US); Randolph S. Kolvick, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/064,741

(22) Filed: Feb. 24, 2005

(65) Prior Publication Data

US 2006/0187739 A1 Aug. 24, 2006

(51) Int. Cl.
*G11C 8/00* (2006.01)
(52) U.S. Cl. ............. 365/230.05; 365/200; 365/230.03
(58) Field of Classification Search .......... 365/230.05, 365/230.04, 230.03, 200
See application file for complete search history.

(56) References Cited

U.S. PATENT DOCUMENTS

| | | | | |
|---|---|---|---|---|
| 7,130,229 B2* | 10/2006 | Dahlen et al. | ............... | 365/200 |
| 2004/0093472 A1* | 5/2004 | Dahlen et al. | ............... | 711/158 |
| 2005/0278494 A1* | 12/2005 | Hillier et al. | ............... | 711/162 |
| 2006/0106956 A1* | 5/2006 | Hillier et al. | ................. | 710/40 |
| 2006/0161759 A1* | 7/2006 | Hillier et al. | ............... | 711/202 |
| 2006/0184846 A1* | 8/2006 | Hillier et al. | ............... | 714/718 |
| 2006/0248411 A1* | 11/2006 | Kirscht | ....................... | 714/704 |

* cited by examiner

*Primary Examiner*—Son Dinh
*Assistant Examiner*—Hien N Nguyen
(74) *Attorney, Agent, or Firm*—Dugan & Dugan

(57) ABSTRACT

In an aspect, a method is provided for using memory. The method includes the steps of (1) employing memory stacking, memory mirroring and memory interleaving in a total memory to reduce a number of memory entries that are written to an input/output (I/O) device while a portion of the total memory is replaced; and (2) storing data in the total memory. Numerous other aspects are provided.

13 Claims, 7 Drawing Sheets

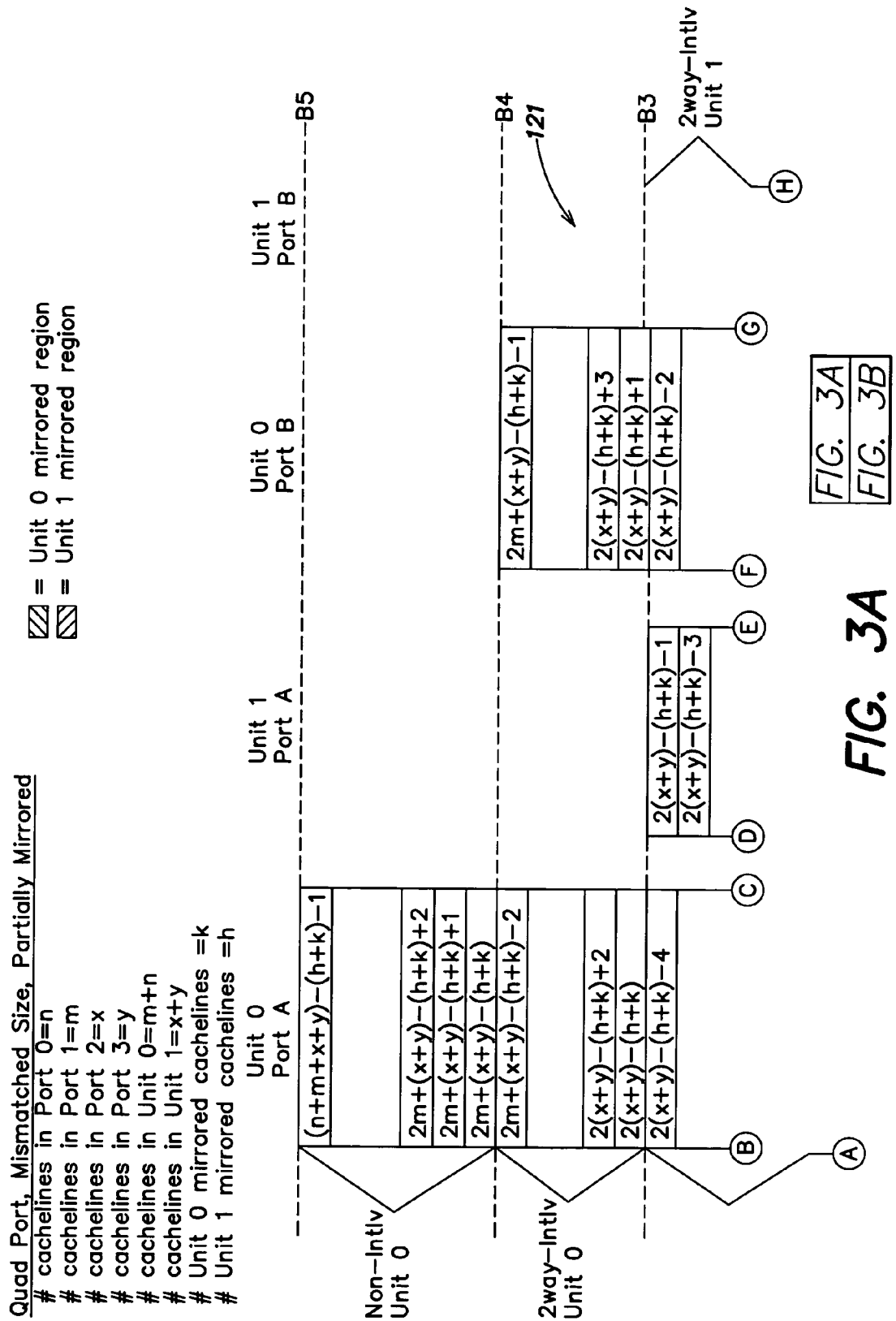

METHODS AND APPARATUS FOR USING MEMORY

FIELD OF THE INVENTION

The present invention relates generally to computer systems, and more particularly to methods and apparatus for using memory.

BACKGROUND

A computer system including or coupled to a plurality of memories may employ a conventional memory configuration for storing data in such memories. During operation, the computer system may determine one or more of the plurality of memories are faulty, and consequently, need to be replaced. However, a conventional memory configuration typically requires data from a large amount of memory entries to be written elsewhere (e.g., to a hard disk) before faulty memory may be replaced (e.g., while a computer system is operating). Methods and apparatus for using memory that increase the efficiency of replacing faulty memory in a computer system (during operation of the computer system) are desired.

SUMMARY OF THE INVENTION

In a first aspect of the invention, a first method is provided for using memory. The first method includes the steps of (1) employing memory interleaving in a mirrored portion of a total memory; and (2) storing data in the total memory.

In a second aspect of the invention, a second method is provided for using memory. The second method includes the steps of (1) employing memory stacking, memory mirroring and memory interleaving in a total memory to reduce a number of memory entries that are written to an input/output (I/O) device while a portion of the total memory is replaced; and (2) storing data in the total memory.

In a third aspect of the invention, a third method is provided. The third method includes the steps of (1) employing memory stacking and memory mirroring in a total memory to reduce a number of memory entries that are written to an input/output (I/O) device while a portion of the total memory is replaced; and (2) storing data in the total memory. The total memory includes a first plurality of memories coupled to respective memory ports in a first group of memory ports of a memory controller and a second plurality of memories coupled to respective memory ports in a second group of memory ports of the memory controller.

In a fourth aspect of the invention, a fourth method is provided. The fourth method includes the steps of (1) employing memory stacking and memory interleaving in a total memory to reduce a number of memory entries that are written to an input/output (I/O) device while a portion of the total memory is replaced; and (2) storing data in the total memory. The total memory includes a first plurality of memories coupled to respective memory ports in a first group of memory ports of a memory controller and a second plurality of memories coupled to respective memory ports in a second group of memory ports of the memory controller.

In a fifth aspect of the invention, a fifth method is provided. The fifth method includes the steps of (1) storing data in a total memory; (2) employing memory mirroring in one or more portions of the total memory; and (3) employing memory interleaving in a mirrored portion of the memory. The total memory includes a first plurality of memories coupled to respective memory ports in a first group of memory ports of a memory controller and a second plurality of memories coupled to respective memory ports in a second group of memory ports of the memory controller.

In a sixth aspect of the invention, a sixth method is provided. The sixth method includes the steps of (1) storing data in a total memory; (2) employing memory stacking and memory mirroring in the total memory; and (3) reducing a number of memory entries that are written to an input/output (I/O) device while a portion of the total memory is replaced. The total memory includes a first plurality of memories coupled to respective ports in a first group of memory ports of a memory controller and a second plurality of memories coupled to respective memory ports in a second group of memory ports of the memory controller.

In a seventh aspect of the invention, a seventh method is provided. The seventh method includes the steps of (1) storing data in a total memory; (2) employing memory stacking and memory interleaving in the total memory; and (3) reducing a number of memory entries that are written to an input/output (I/O) device while a portion of the total memory is replaced. The total memory includes a first plurality of memories coupled to respective ports in a first group of memory ports of a memory controller and a second plurality of memories coupled to respective memory ports in a second group of memory ports of the memory controller.

In an eighth aspect of the invention, a first apparatus is provided. The first apparatus includes (1) a processor; (2) an input/output (I/O) device; (3) a memory controller, coupled to the processor and I/O device; and (4) a total memory coupled to the memory controller. The apparatus is adapted to (a) employ memory interleaving in a mirrored portion of the total memory; and (b) store data in the total memory.

In a ninth aspect of the invention, a second apparatus is provided. The second apparatus includes (1) a processor; (2) an input/output (I/O) device; (3) a memory controller, coupled to the processor and I/O device; and (4) a total memory coupled to the memory controller. The apparatus is adapted to (a) employ memory stacking, memory mirroring and memory interleaving in the total memory to reduce a number of memory entries that are written to the input/output (I/O) device while a portion of the total memory is replaced; and (b) store data in the total memory.

In a tenth aspect of the invention, a third apparatus is provided. The third apparatus includes (1) a processor; (2) an input/output (I/O) device; (3) a memory controller, coupled to the processor and I/O device, including a first and second group of memory ports; and (4) a total memory coupled to the memory controller, wherein the total memory include a first plurality of memories coupled to respective memory ports in the first group and a second plurality of memories coupled to respective memory ports in the second group. The apparatus is adapted to (a) employ memory stacking and memory mirroring in the total memory to reduce a number of memory entries that are written to the input/output (I/O) device while a portion of the total memory is replaced; and (b) store data in the total memory.

In an eleventh aspect of the invention, a fourth apparatus is provided. The fourth apparatus includes (1) a processor; (2) an input/output (I/O) device; (3) a memory controller, coupled to the processor and I/O device, including a first and second group of memory ports; and (4) a total memory coupled to the memory controller, wherein the total memory include a first plurality of memories coupled to respective memory ports in the first group and a second plurality of memories coupled to respective memory ports in the second group. The apparatus is adapted to (a) employ memory stacking and memory interleaving in the total memory to reduce a number of memory entries that are written to the input/output (I/O) device while a portion of the total memory is replaced; and (b) store data in the total memory.

In a twelfth aspect of the invention, a fifth apparatus is provided. The fifth apparatus includes (1) a processor; (2) an input/output (I/O) device; (3) a memory controller, coupled to the processor and I/O device, including a first and second group of memory ports; and (4) a total memory coupled to the memory controller, wherein the total memory include a first plurality of memories coupled to respective memory ports in the first group and a second plurality of memories coupled to respective memory ports in the second group. The apparatus is adapted to (a) store data in the total memory; (b) employ memory mirroring in one or more portions of the total memory; and (c) employ memory interleaving in a mirrored portion of the memory.

In a thirteenth aspect of the invention, a sixth apparatus is provided. The sixth apparatus includes (1) a processor; (2) an input/output (I/O) device; (3) a memory controller, coupled to the processor and I/O device, including a first and second group of memory ports; and (4) a total memory coupled to the memory controller, wherein the total memory include a first plurality of memories coupled to respective memory ports in the first group and a second plurality of memories coupled to respective memory ports in the second group. The apparatus is adapted to (a) store data in the total memory; (b) employ memory stacking and memory mirroring in the total memory; and (c) reduce a number of memory entries that are written to the input/output (I/O) device while a portion of the total memory is replaced.

In a fourteenth aspect of the invention, a seventh apparatus is provided. The seventh apparatus includes (1) a processor; (2) an input/output (I/O) device; (3) a memory controller, coupled to the processor and I/O device, including a first and second group of memory ports; and (4) a total memory coupled to the memory controller, wherein the total memory include a first plurality of memories coupled to respective memory ports in the first group and a second plurality of memories coupled to respective memory ports in the second group. The apparatus is adapted to (a) store data in the total memory; (b) employ memory stacking and memory interleaving in the total memory; and (c) reduce a number of memory entries that are written to an input/output (I/O) device while a portion of the total memory is replaced. Numerous other aspects are provided in accordance with these and other aspects of the invention.

Other features and aspects of the present invention will become more fully apparent from the following detailed description, the appended claims and the accompanying drawings.

BRIEF DESCRIPTION OF THE FIGURES

FIGS. 3A and 3B are a block diagram of a first exemplary memory configuration employed by the apparatus for using memory in accordance with an embodiment of the present invention.

DETAILED DESCRIPTION

The present invention provides methods and apparatus for using memory. More specifically, in some embodiments, the present invention provides methods and apparatus for improving performance while replacing a portion of memory and reducing the time required for such replacement. A computer system may include one or more processors coupled to memory, for example, via a memory controller. More specifically, the memory controller may include a plurality of ports, each of which may couple to a separate memory (e.g., DRAM or the like) thereby providing the computer system with access to a total memory.

In conventional systems, memory configurations are employed which require a large amount of data (e.g., data from a large number of memory entries) to be stored (e.g., temporarily) elsewhere, such as in a disk drive, while a faulty portion of memory is replaced. In contrast, the present methods and apparatus employ memory configurations which reduce an amount of data that must be stored elsewhere while a faulty portion of memory is replaced. More specifically, the present methods and apparatus may employ a memory configuration such that portions of the total memory operate in a stack mode (e.g., a modified stack mode) and at least one of memory address interleaving and mirroring are employed within the total memory. In a typical stack mode, memory coupled to a second memory port may not be accessed until memory coupled to a first memory port is exhausted.

By employing such memory configuration, a number of entries that must be stored elsewhere while a faulty portion of the total memory is replaced may be reduced compared to conventional systems. Therefore, less input/output (I/O) processing must be performed to access data while replacing the faulty memory and less I/O processing must be performed to restore such data to the total memory. In this manner, performance of the system may be improved while memory is replaced and the time required for such replacement is reduced.

Further, in some embodiments, the present methods and apparatus may employ a memory configuration such that one or more portions of a first portion-of a total memory is mirrored in a second portion of the total memory and memory addresses within such mirrored portion are interleaved, thereby improving memory performance.

Figure 1:
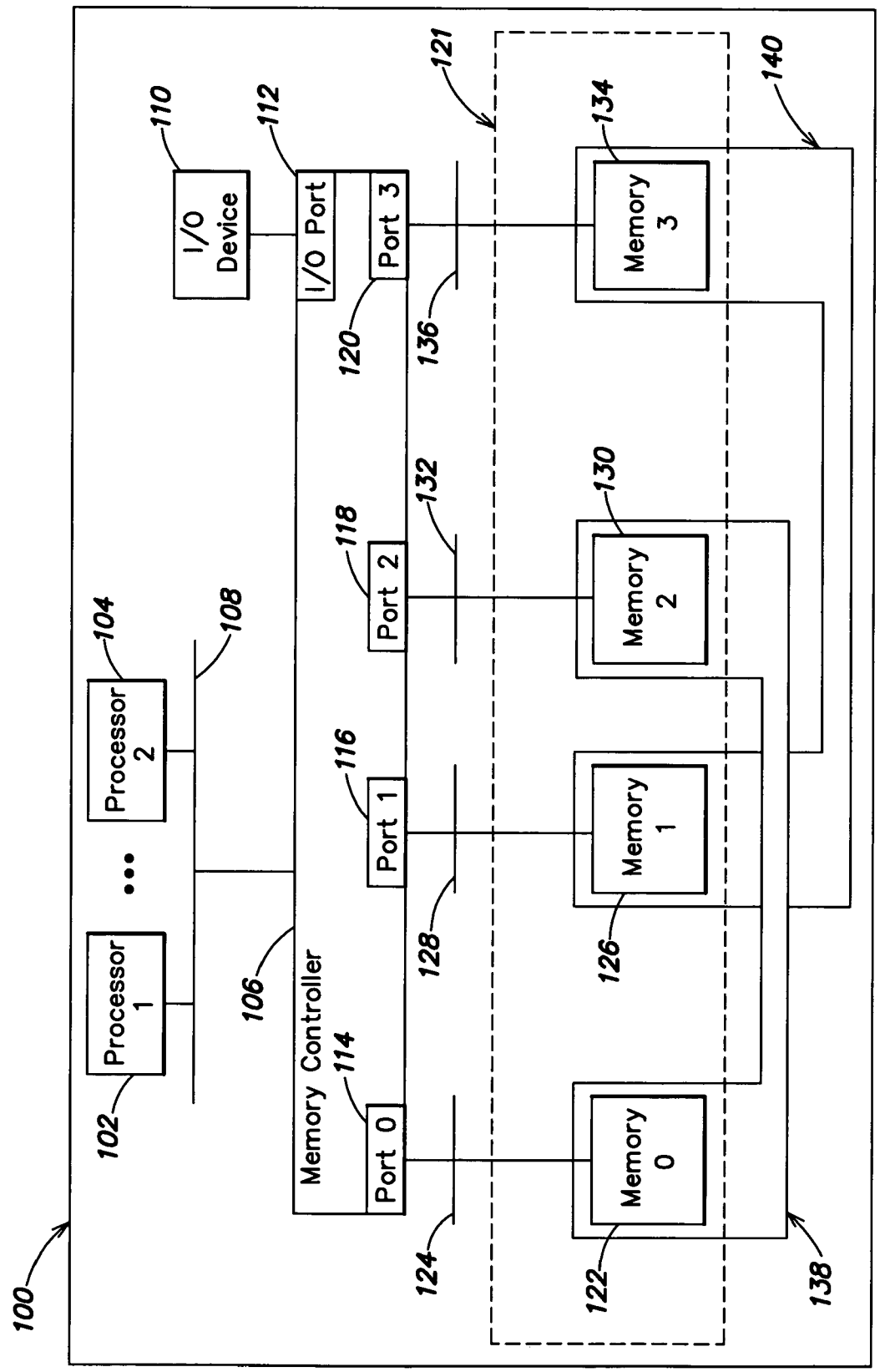
FIG. 1 is a block diagram of an apparatus for using memory in accordance with an embodiment of the present invention.

FIG. 1 is a block diagram of an apparatus for using memory in accordance with an embodiment of the present invention. The apparatus may be a computer system or the like. With reference to FIG. 1, the apparatus 100 may include one or more processors 102-104 coupled to a memory controller 106 via a processor bus 108. The memory controller 106 includes and may couple to one or more input/output (I/O) devices 110 (only one shown) via an I/O port 112. The memory controller 106 includes a plurality of memory ports 114-120 for coupling to a total memory 121. More specifically, the plurality of memory ports 114-120 are coupled to respective memories included in the total memory 121. For example, a first memory port 114 may be coupled to a first memory 122 via a first memory bus 124, a second memory port 116 may be coupled to a second memory 126 via a second memory bus 128, a third memory port 118 may be coupled to a third memory 130 via a third memory bus 132 and a fourth memory port 120 may be coupled to a fourth memory 134 via a fourth memory bus 136.

In some embodiments, two or more such memories 122, 126, 130, 134 may be included (e.g., grouped together) on a single card adapted to couple to a corresponding plurality (e.g., group) of memory ports. For example, a first card 138 may include the first 122 and third memories 130 and a second card 140 may include the second 126 and fourth memories 134. However, the memories may packaged differently. For example, a larger or smaller number of memories may be included in the first 138 and/or second card 140. Although the memory controller 106 includes four memory ports 114-120, a larger or smaller number of memory ports 114-120 may be employed. Further, although the total memory 121 includes four memories 122, 126, 130, 134, the total memory 121 may include a larger or smaller number of memories. Two or more of the memories 122, 126, 130, 134 may be of the same size (e.g., storing capacity) or of different (e.g., mismatched) sizes. For example, two or more of the memories 122, 126, 130, 134 may include the same number of cachelines for storing data or different numbers of cachelines for storing data.

The memory controller 106, an I/O port 112, and/or a memory port 114-120 may include any suitable combination of logic, registers, memory or the like. Further, the memory controller 106 is adapted to receive commands from a processor 102-104 and/or an I/O device 110, and in response to receiving a command, access a memory port 114-120, thereby providing such command with access to the total memory 121 (e.g., a memory address of the total memory).

The apparatus (e.g., computer system) 100 may employ a memory configuration that determines how addresses are assigned to cachelines included each of the plurality of memories 122, 126, 130, 134 and/or how data is stored in the total memory 121. The present methods and apparatus employ a memory configuration such that memory performance is improved and/or a number of entries that must be stored elsewhere while a faulty portion of the total memory is replaced may be reduced compared to conventional systems. Details of exemplary memory configurations in accordance with respective embodiments of the present methods and apparatus are described below with reference to FIGS. 2-6.

Figure 2:
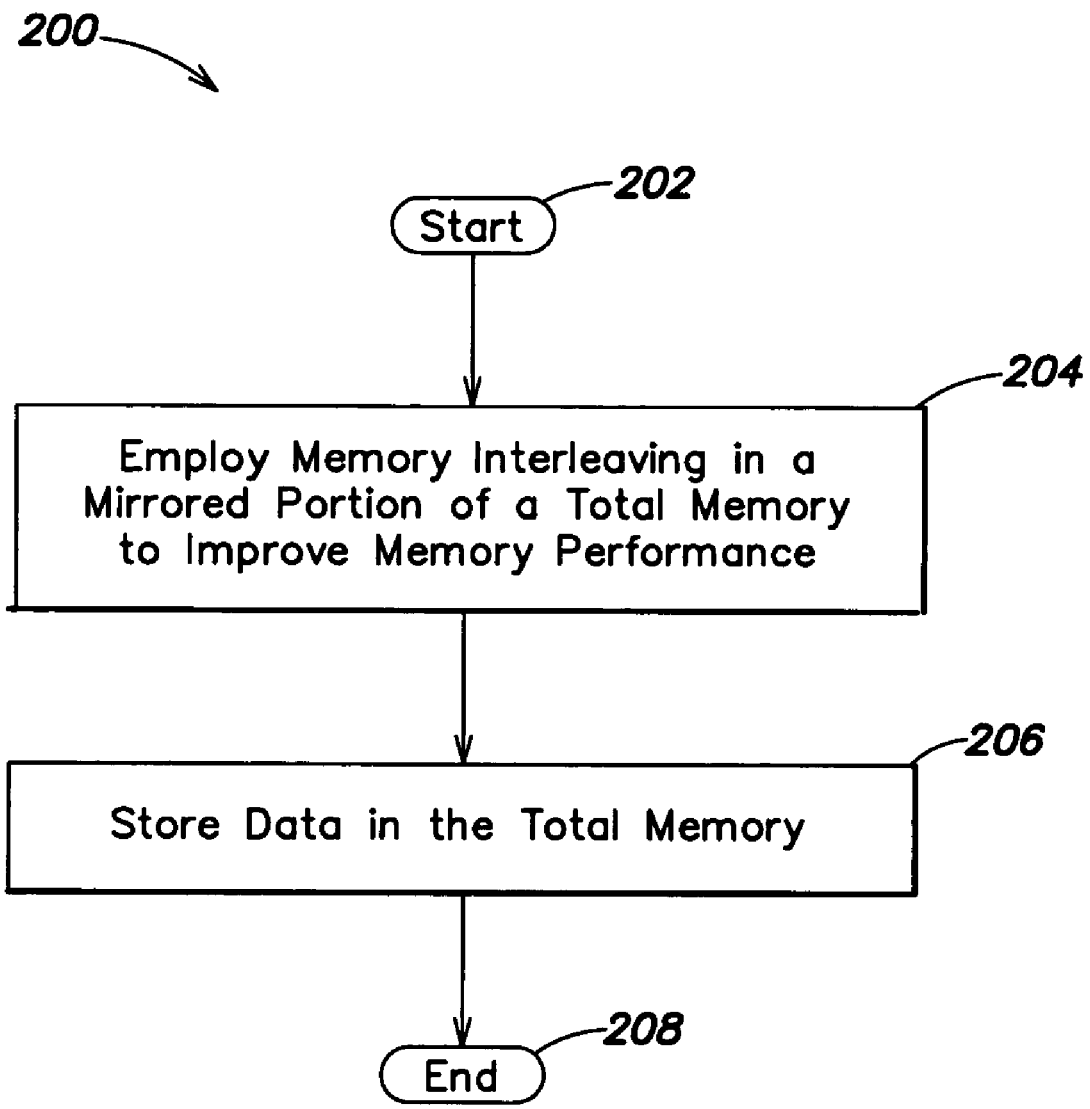
FIG. 2 illustrates a first exemplary method for using memory in accordance with an embodiment of the present invention.

The operation of the apparatus for replacing memory is now described with reference to FIG. 1 and with reference to FIGS. 2-3B which illustrate a first exemplary method for using memory in accordance with an embodiment of the present invention and a block diagram of a first exemplary memory configuration employed by the apparatus for using memory in accordance with an embodiment of the present invention. With reference to FIG. 2, in step 202, the method 200 begins. In step 204, memory interleaving is employed in a mirrored portion of a total memory to improve memory performance. For example, the computer system 100 may employ a first exemplary memory configuration in which memory mirroring is employed and memory interleaving is employed within a mirrored portion of the total memory. Such memory configuration may be provided, for example, by a user. Memory mirroring, allows the same data to be stored in two different cachelines, for example, in separate memories. Such cachelines may share the same address. Memory interleaving assigns consecutive (e.g., sequential) memory addresses to cachelines from different memories. In this manner, such cachelines may be accessed in an efficient manner, because the computer system 100 may improve an efficiency with which memory busses 124, 128, 132 136 and memory ports 114-120 are employed. For example, the computer system may access a first cacheline address in a first memory via a first memory port and first memory bus, and access the next cacheline address in a second memory via a second memory port and second memory bus.

Figure 3B:
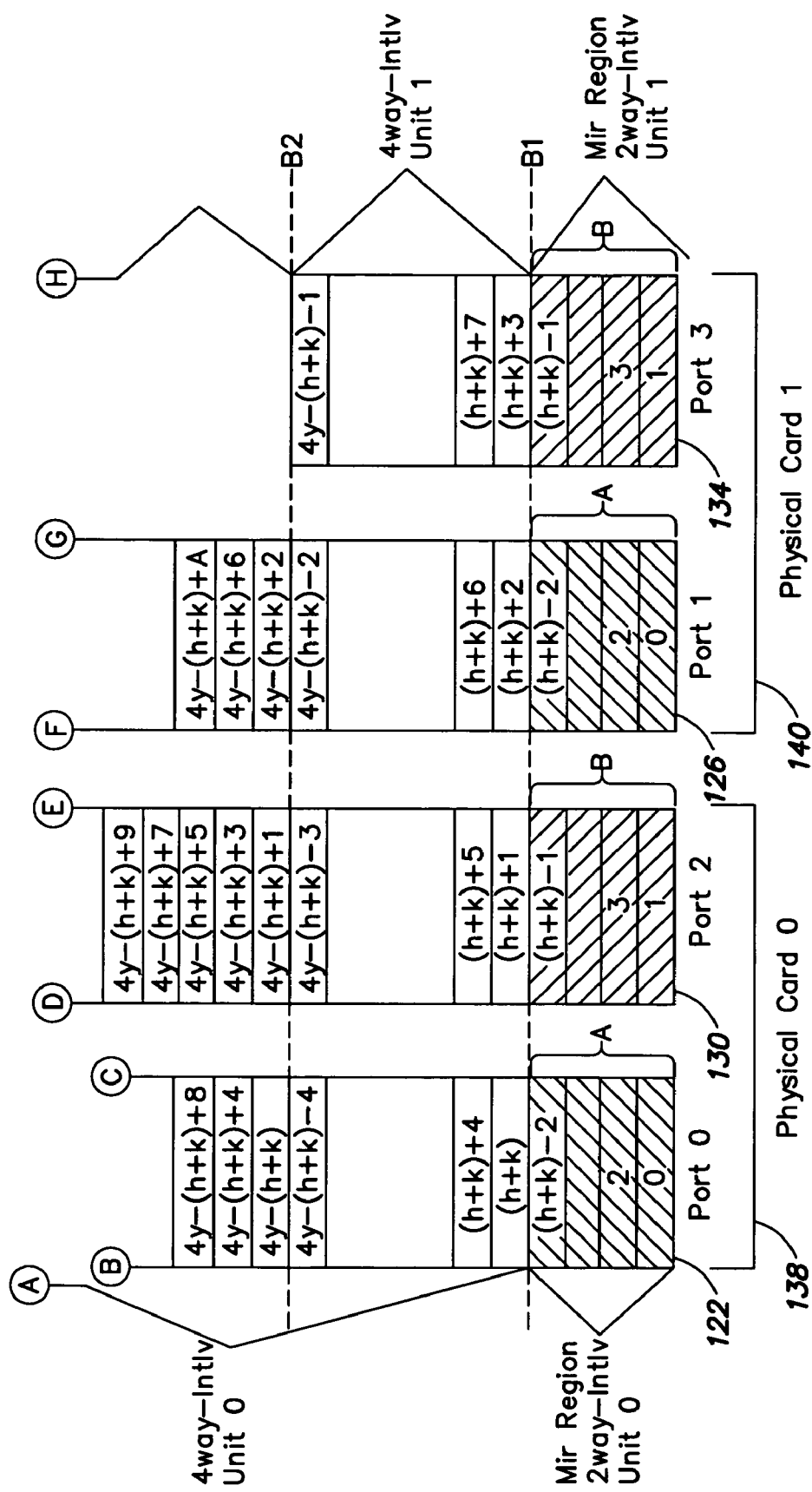

FIGS. 3A and 3B illustrate the first exemplary memory configuration that may be employed by the apparatus 100. A first memory 122 coupled to a first memory port (Port 0) 114 may include n cacheline entries, a second memory 126 coupled to a second memory port (Port 1) 116 may include m cachelines, a third memory 130 coupled to a third memory port (Port 2) 118 may include x cachelines and a fourth memory 134 coupled to a fourth memory port (Port 3) 120 may include y cachelines. Therefore, the memories 122, 126, 130, 134 are of mismatched sizes (although two or more of the memories may be of the same size). The first 122 and third memories 130 may be included in a first card (Physical Card 0) 138. Similarly, the second 126 and fourth memories 134 may be included in a second card (Physical Card 1) 140. Further, a memory from the first card 138 may be grouped with a memory from the second card 140 into a unit. For example, the first 122 and second memories 126 may form a first unit (Unit 0) and the third 130 and fourth memories 134 may form a second unit (Unit 1). Therefore, the total number of cachelines provided by the memories of the first unit is m+n, and the total number of cachelines provided by the memories of the second unit is x+y.

According to the first exemplary memory configuration, k cachelines are mirrored in the first unit. For example, the first k entries (e.g., cachelines) of the first 122 and second memories 126 are respectively mirrored, thereby forming a first mirrored region A. Therefore, a first cacheline of the k cachelines in the first 122 and second memories 126 have the same address and may store the same data, a second cacheline of the k cachelines in the first 122 and second memories 126 have the same address and may store the same data, and so on. Similarly, h cachelines are mirrored in the second unit. For example, the first h entries (e.g., cachelines) of the third 130 and fourth memories 134 are respectively mirrored, thereby forming a second mirrored region B. Therefore, a first cacheline of the h cachelines in the third 130 and fourth memories 134 have the same address and may store the same data, a second cacheline of the h cachelines in the third 130 and fourth memories 134 have the same address and may store the same data, and so on.

Further, the first exemplary memory configuration in accordance with an embodiment of the present invention may employ memory interleaving (e.g., in a mirrored portion of the total memory). More specifically, cacheline addresses (e.g., 0 through (h+k)−2) in the first mirrored region A are interleaved with cacheline addresses (e.g., 1 through (h+k)−1) in the second mirrored region B. For example, a first address (e.g., 0) is assigned to a first cacheline of the k cachelines in each memory in the first unit (Unit 0). The next sequential address (e.g., 1) is assigned to a first cacheline of the h cachelines in each memory in the second unit (Unit 1). The next sequential address (e.g., 2) is assigned to a second cacheline of the k cachelines in each memory in the first unit (Unit 0), the next sequential address (e.g., 3) is assigned to a second cacheline of the h cachelines in each memory of the second unit (Unit 1), and so on, until a first boundary B1 is reached in which cachelines in the mirrored region (e.g., mirrored region A and B) are exhausted. Thus, a lower memory region of the first 138 and second cards 140 may be mirrored.

In this manner, addresses of the total memory 121 are two-way interleaved between the first A and second mirrored regions B. As described above, interleaving cacheline addresses between two memories may improve an efficiency of memory access. Further, memory mirroring provides redundancy such that data in the mirrored region (e.g., mirrored region A and B) is accessible even if a memory 122, 126, 130, 134 or card 138, 140 is faulty.

Above the mirrored region, the first Unit 0 and second units Unit 1 are four-way interleaved. More specifically, cacheline addresses are interleaved among a plurality of memories (e.g., the first 122 through fourth memories 134) until a second boundary B2 is reached in which cachelines in the smallest memory are exhausted. For example, a cacheline (e.g., the next cacheline) above the mirrored region A in the first memory 122 may be assigned address (h+k), a cacheline above the mirrored region B in the third memory 130 is assigned address (h+k)+1, a cacheline above the mirrored region A in the second memory 126 is assigned address (h+k)+2, a cacheline above the mirrored region B in the fourth memory 134 is assigned address (h+k)+3. Thereafter, a cacheline (e.g., the next cacheline) in the first memory 122 may be assigned address (h+k)+4, and so on, until the second boundary B2 is reached. In the example shown, the second boundary B2 is reached when cachelines of the fourth memory 134 of the second unit Unit 1 are exhausted, for example, when a cacheline in the fourth memory is assigned address 4y−(h+k)−1.

Thereafter, the unit (e.g., Unit 1) including the smallest memory may employ two-way interleaving while the other unit (e.g., Unit 0) employs four-way interleaving until a third boundary B3 is reached in which (1) cachelines of all memories in the unit including the smallest memory are exhausted; or (2) cachelines in a memory of the other unit are exhausted. For example, a cacheline (e.g., the next cacheline) in the first memory 122 may be assigned address 4y−(h+k), a cacheline in the third memory 130 may be assigned address 4y−(h+k)+1, a cacheline in the second memory 126 may be assigned address 4y−(h+k)+2, and because cachelines of the fourth memory 134 are exhausted, a cacheline (e.g., the next cacheline) in the third memory 130 is assigned address 4y−(h+k)+3. Thereafter, a cacheline (e.g., the next cacheline) in the first memory 122 may be assigned address 4y−(h+k)+4, and so on, until the third boundary B3 is reached. In the example shown, the third boundary B3 is reached when cachelines of the third memory 130 are exhausted, for example, when a cacheline in the third memory 130 is assigned address 2(x+y)−(h+k)−1. In this manner, cachelines of a remaining memory (e.g., the third memory 130) in the second unit Unit 1 may be assigned every other address and cachelines of a remaining memory (e.g., the first 122 and third memories 126) are assigned every fourth address.

Thereafter, because the cachelines of all memories in the unit including the smallest memory are exhausted (e.g., Unit 1), memories in the other unit (e.g., Unit 0) employ two-way interleaving. For example, the first 122 and second memories 126 of the second unit Unit 0 employ two-way interleaving. More specifically, a cacheline (e.g., the next cacheline) of the first memory 122 may be assigned address 2(x+y)−(h+k), a cacheline of the second memory 126 may assigned address 2(x+y)−(h+k)+1, a cacheline of the first memory 122 may be assigned address 2(x+y)−(h+k)+2, and so on, until a fourth boundary B4 is reached in which cachelines of a memory (e.g., the first 122 or third memory 126) in the first unit Unit 1 are exhausted. In the example shown, the fourth boundary B4 is reached when cachelines of the second memory 126 are exhausted, for example, when a cacheline in the second memory 126 is assigned address 2m+(x+y)−(h+k)−1. Thereafter, addresses assigned to the remaining memory are non-interleaved (e.g., sequential) until the fifth boundary B5 in which cachelines of the remaining memory are exhausted. For example, a cacheline (e.g., the next cacheline) of the first memory 122 may be assigned address 2m+(x+y)−(h+k), and another cacheline (e.g., the next cacheline) of the first memory 122 may be assigned address 2m+(x+y)−(h+k)+1, and so on until the fifth boundary B5 is reached. In the example shown, the fifth boundary B5 is reached when cachelines of the first memory 122 are exhausted, for example, when a cacheline in the first memory 122 is assigned address (n+m+x+y)−(h+k)−1.

Alternatively, in some cases, the third boundary B3 may be reached when cachelines in a memory (e.g., the second memory 126) of the other unit (e.g., Unit 0) are exhausted. In such cases, thereafter, respective memories remaining in the first Unit 0 and second units Unit 1 employ two-way interleaving, and addresses are assigned accordingly, until all cachelines in one such memory is exhausted. Thereafter, addresses assigned to the remaining memory are non-interleaved (e.g., sequential) until cachelines of such remaining memory are exhausted.

Although, in the example above, the sizes of mirrored regions A and B included in the first Unit 0 and second units Unit 1, respectively, are equal, such mirrored regions do not need to be the same size, as long as the smaller unit is fully mirrored. Further, it should be understood that the number of memories and sizes of such memories employed in the above memory configuration are exemplary. For example, a larger or smaller number of memories may be employed. Further, the number of cachelines mirrored in a unit is exemplary, and therefore, a larger or smaller number may be employed. Additionally, the memory configuration may employ a different mirroring and/or interleaving scheme, so long as the memory configuration includes at least partial mirroring of memory, and interleaving in such portions of memory.

By using a memory configuration which employs memory interleaving in a mirrored portion of the total memory (in the manner described above), such memory configuration efficiently may provide memory redundancy. Further, interleaving in the mirrored portion of the total memory increases an efficiency with which such memory may be accessed.

In step 206, data is stored in the total memory. For example, data is stored in a total memory 121, which is configured as described above. More specifically, some data is stored in the mirrored portion (e.g., mirrored regions A and B) of the total memory 121 which employs memory interleaving. For example, a portion of the total memory 121 in which memory interleaving and mirroring are employed may include a remote cache for storing data (e.g., important data). For example the remote cache may store data retrieved via the memory controller 106 from other nodes (e.g., memory controllers of such nodes). However, different data may be stored in the portion of the total memory in which memory interleaving and mirroring are employed. Further, data may be stored in one or more remaining portions of the total memory 121.

Thereafter, step 208 is performed. In step 208, the method 200 ends. Through use of the method 200 memory performance may be improved.

Figure 4:
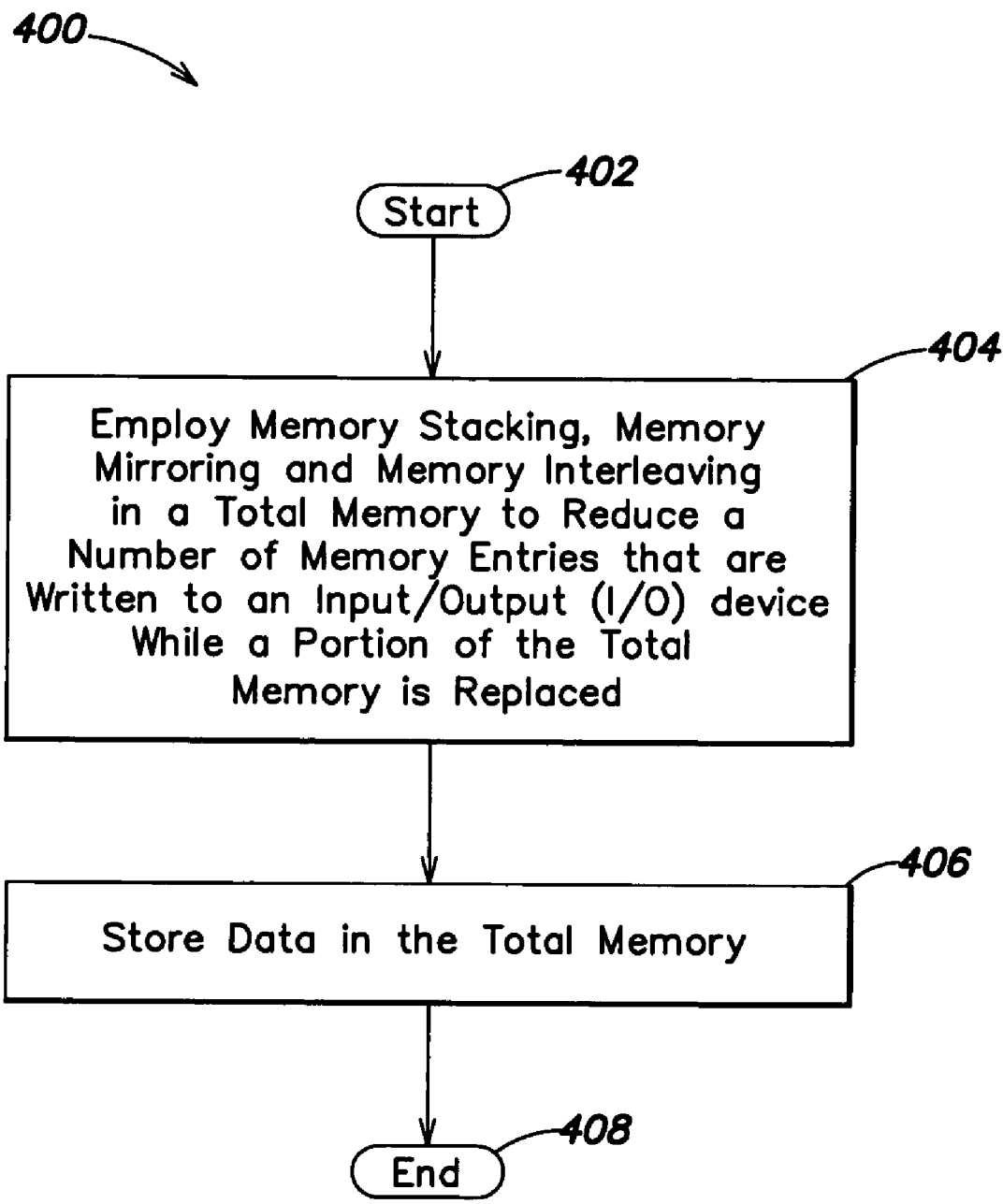
FIG. 4 illustrates a second exemplary method for using memory in accordance with an embodiment of the present invention.

The operation of the apparatus for using memory is now described with reference to FIG. 1 and with reference to FIGS. 4-5B which illustrate a second exemplary method for using memory in accordance with an embodiment of the present invention and a block diagram of a second exemplary memory configuration employed by the apparatus for using memory in accordance with an embodiment of the present invention. With reference to FIG. 4, in step 402, the method 400 begins. In step 404, memory stacking, memory mirroring and memory interleaving are employed in a total memory to reduce a number of memory entries that are written to an input/output (I/O) device while a portion of the total memory is replaced. For example, the computer system 100 may employ a second exemplary memory configuration in which memory stacking (e.g., a modified memory stacking as described below), memory mirroring and memory interleaving are employed. Such memory configuration may be provided, for example, by a user. Memory stacking allows cacheline addresses to increment sequentially through cachelines included in a memory designated as a bottom memory until cacheline entries in such memory are exhausted. Thereafter, cacheline addresses sequentially increment through cachelines included in a memory designated as a top memory. Although memory stacking of two memories is described above, memory stacking of a plurality of memories may be employed in a similar manner.

Figure 5A:
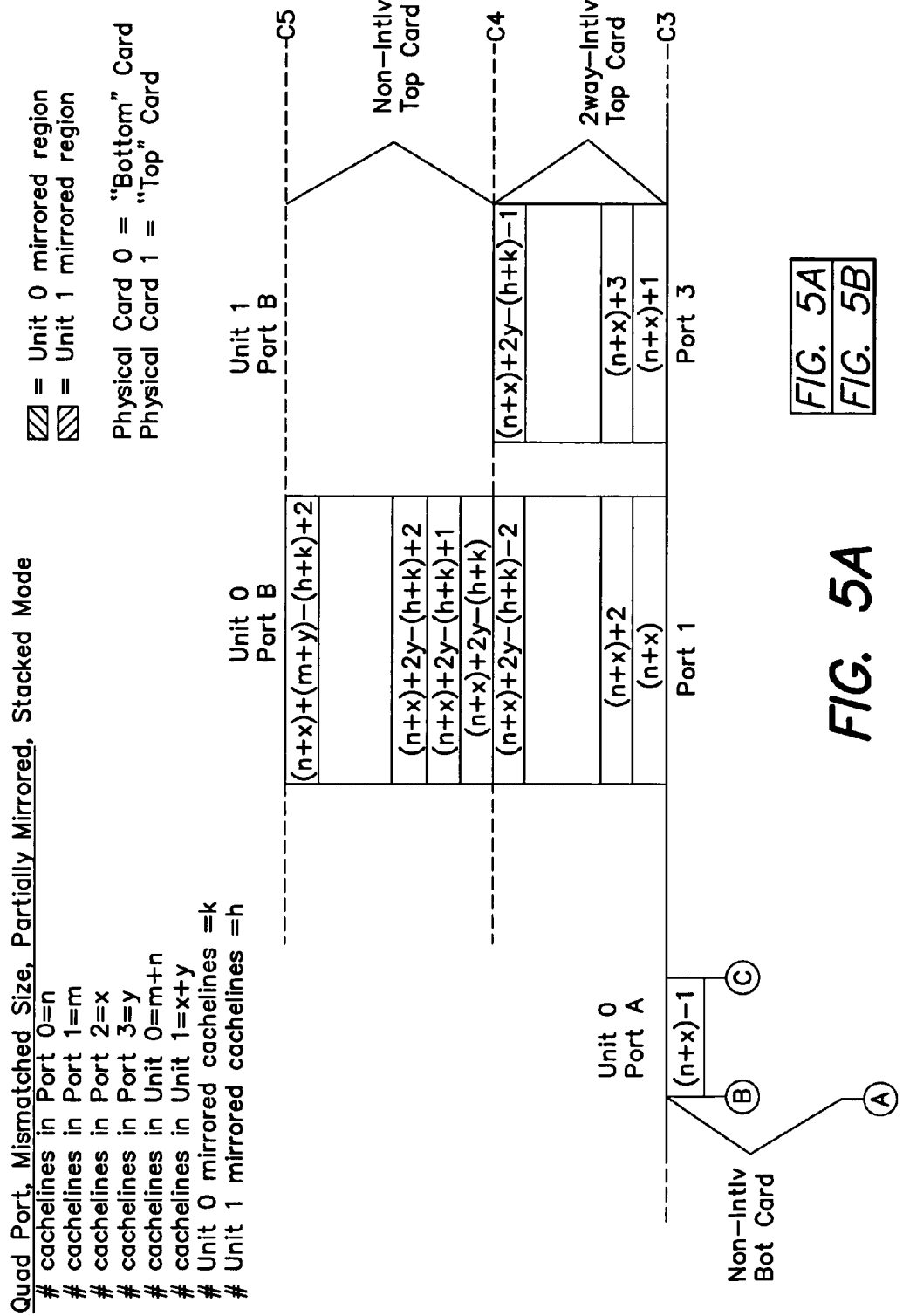
FIGS. 5A and 5B are a block diagram of a second exemplary memory configuration employed by the apparatus for using memory in accordance with an embodiment of the present invention.
Figure 5B:
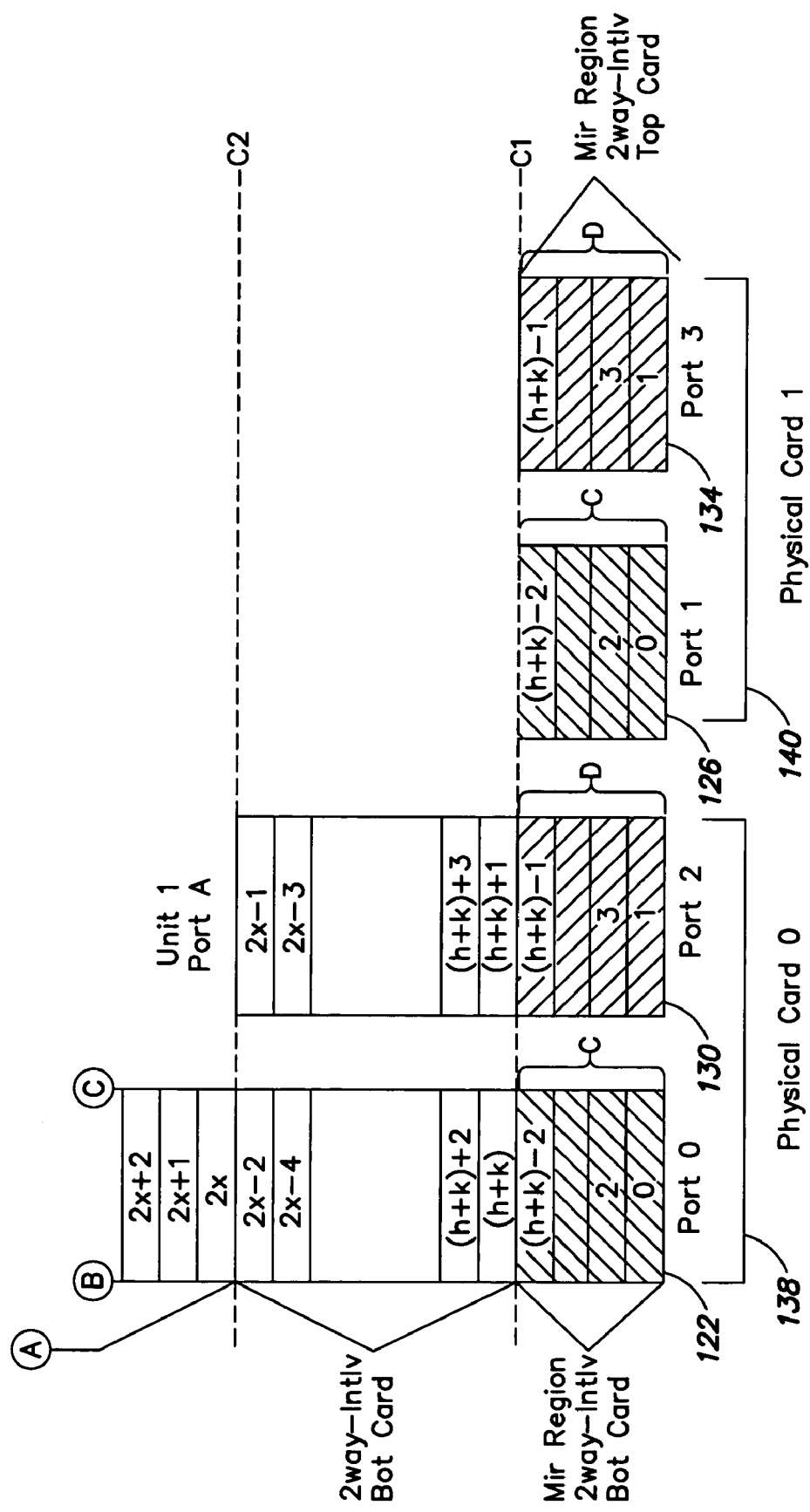

FIGS. 5A and 5B illustrate the second exemplary memory configuration that may be employed by the apparatus 100. A first memory 122 coupled to a first memory port (Port 0) 114 may include n memory (e.g., cacheline) entries, a second memory 126 coupled to a second memory port (Port 1) 116 may include m cachelines, a third memory 130 coupled to a third memory port (Port 2) 118 may include x cachelines and a fourth memory 134 coupled to a fourth memory port (Port 3) 120 may include y cachelines. Therefore, the memories 122, 126, 130, 134 are of mismatched sizes (although two or more of the memories 122, 126, 130, 134 may be of the same size). The first 122 and third memories 130 may be included in a first card (Physical Card 0) 138. Similarly, the second 126 and fourth memories 134 may be included in a second card (Physical Card 1) 140. Further, a memory from the first card 138 may be grouped with a memory from the second card 140 into a unit. For example, the first 122 and second memories 126 may form a first unit (Unit 0) and the third 130 and fourth memories 134 may form a second unit (Unit 1). Therefore, the total number of cachelines provided by the memories of the first unit is m+n, and the total number of cachelines provided by the memories of the second unit is x+y. The first card 138 may be designated (e.g., by a user) as a bottom card and the second card 140 may be designated as a top card. Therefore, aside from portions of the second card 140 which are mirrored (as described below), cachelines in the second card 140 are not assigned addresses until cachelines in the first card 138 are exhausted. In this manner, memory stacking (e.g., a modified memory stacking) is employed in the total memory 121.

According to the second exemplary memory configuration, k cachelines are mirrored in the first unit Unit 0. For example, the first k entries (e.g., cachelines) of the first memory 122 are mirrored by the first k entries of the second memory 126, thereby forming a first mirrored region C. Therefore, a first cacheline of the k cachelines in the first 122 and second memories 126 have the same address and may store the same data, a second cacheline of the k cachelines in the first 122 and second memories 126 have the same address and may store the same data, and so on. Similarly, h cachelines are mirrored in the second unit Unit 1. For example, the first h entries (e.g., cachelines) of the third memory 130 are mirrored by the first h entries of the fourth memory 134, thereby forming a second mirrored region D. Therefore, a first cacheline of the h cachelines in the third 130 and fourth memories 134 have the same address and may store the same data, a second cacheline of the h cachelines in the third 130 and fourth memories 134 have the same address and may store the same data, and so on.

Further, the second exemplary memory configuration in accordance with an embodiment of the present invention may employ memory interleaving (e.g., in a mirrored and/or non-mirrored portion of the total memory 121). More specifically, cacheline addresses (e.g., 0 through (h+k)−2) in the first mirrored region C are interleaved with cacheline addresses (e.g., 1 through (h+k)−1) in the second mirrored region D. For example, a first address (e.g., 0) may be assigned to a first cacheline of the k cachelines in each memory in the first unit Unit 0. The next sequential address (e.g., 1) is assigned to a first cacheline of the h cachelines in each memory in the second unit Unit 1. The next sequential address (e.g., 2) is assigned to a second cacheline of the k cachelines in each memory in the first unit Unit 0, the next sequential address (e.g., 3) is assigned to a second cacheline of the h cachelines in each memory of the second unit Unit 1, and so on, until a first boundary C1 is reached in which cachelines in the mirrored region (e.g., mirrored regions C and D) are exhausted.

In this manner, addresses of the total memory 121 may be two-way interleaved between the first C and second mirrored regions D. As described above, interleaving cacheline addresses between two memories may improve an efficiency of memory access. Further, memory mirroring provides redundancy such that data in the mirrored region (e.g., mirrored regions C and D) is accessible even if a memory 122, 126, 130, 134 and/or card 138, 140 is faulty.

Above the mirrored region, memories of the first card 138, such as a memory (e.g., the first memory 122) of the first unit Unit 0 and a memory (e.g., third memory 130) of the second unit Unit 1 may be two-way interleaved and remaining memory of the second card 140 may not be employed until cachelines in memories of the first card 138 are exhausted. More specifically, cacheline addresses may be interleaved among a plurality of memories (e.g., the first 122 and third memories 130) until a second boundary C2 is reached in which cachelines in the smallest of such memories are exhausted. For example, a cacheline (e.g., the next cacheline) above the mirrored region C in the first memory 122 may be assigned address (h+k), a cacheline (e.g., the next cacheline) above the mirrored region D in the third memory 130 is assigned address (h+k)+1, a cacheline (e.g., the next cacheline) in the first memory 122 may be assigned address (h+k)+2, and so on, until the second boundary C2 is reached. In the example shown, the second boundary C2 is reached when cachelines of the third memory 130 of the second unit Unit 1 are exhausted, for example, when a cacheline in the third memory 130 is assigned address 2x−1.

Thereafter, addresses assigned to cachelines in the remaining memory (e.g., the first memory 122) of the first card 138 are non-interleaved (e.g., addressed sequentially) until a third boundary C3 in which cachelines of such remaining memory are exhausted. For example, a cacheline (e.g., the next cacheline) of the first memory 122 may be assigned address 2x, and another cacheline (e.g., the next cacheline) of the first memory 122 may be assigned address 2x+1, and so on, until the third boundary C3 is reached. In the example shown, the third boundary C3 is reached when cachelines of the first memory 122 are exhausted, for example, when a cacheline in the first memory 122 is assigned address (n+x)−1. Although cachelines in the third memory 130 are exhausted before cachelines in the first memory 122, in some embodiments, cachelines in the first memory 122 are exhausted before cachelines in the third memory 130.

Thereafter, because cachelines in memories of the first card 138 are exhausted, memories of a second card 140, such as a memory (e.g., the second memory 126) of the first unit Unit 0 and a memory (e.g., fourth memory 134) of the second unit Unit 1 are two-way interleaved. More specifically, cacheline addresses are interleaved among a plurality of memories (e.g., the second 126 and fourth memories 134) in the second card 140 until a fourth boundary C4 is reached in which cachelines in the smallest of such memories 126, 134 are exhausted. For example, a cacheline (e.g., the next cacheline) above the mirrored region C in the second memory 126 may be assigned address (n+x), a cacheline above the mirrored region D in the fourth memory 134 is assigned address (n+x)+1, a cacheline (e.g., the next cacheline) in the second memory 126 may be assigned address (n+x)+2, and so on, until the fourth boundary C4 is reached. In the example shown, the fourth boundary C4 is reached when cachelines of the fourth memory 134 of the second unit Unit 1 are exhausted, for example, when a cacheline in the fourth memory 134 is assigned address (n+x)+2y−(h+k)−1.

Thereafter, addresses assigned to cachelines in the remaining memory (e.g., the second memory 126) of the second card 140 are non-interleaved (e.g., addressed sequentially) until a fifth boundary C5 in which cachelines of such remaining memory are exhausted. For example, a cacheline (e.g., the next cacheline) of the second memory 126 may be assigned address (n+x)+2y−(h+k), and another cacheline (e.g., the next cacheline) of the second memory 126 may be assigned address (n+x)+2y−(h+k)+1, and so on, until the fifth boundary C5 is reached. In the example shown, the fifth boundary C5 is reached when cachelines of the second memory 126 are exhausted, for example, when a cacheline in the second memory 126 is assigned address (n+x)+(m+y)−(h+k)+2. Although cachelines in the fourth memory 134 are exhausted before cachelines in the second memory 126, in some embodiments (e.g., embodiments including a different memory configuration), cachelines in the second memory 126 are exhausted before cachelines in the fourth memory 134.

It should be understood that the number of memories and sizes of such memories employed in the above memory configuration are exemplary. For example, a larger or smaller number of memories may be employed. Further, the number of cachelines mirrored in a unit Unit 0, Unit 1 is exemplary, and therefore, a larger or smaller number may be employed. Further, the memory configuration may employ a different mirroring, interleaving and/or stacking (e.g., modified stacking) scheme, so long as the memory configuration includes memory mirroring, interleaving and stacking. Although the first card 138 is designated as the bottom card and second card 140 is designated as the top card (e.g., for memory stacking), in some embodiments, the second card 140 may be designated as the bottom card and first card 138 may be designated as the top card.

By using a memory configuration which employs memory stacking, memory mirroring and memory interleaving in a total memory (in the manner described above), such memory configuration may provide memory redundancy and increase an efficiency with which such redundant memory may be accessed. Further, such memory configuration may preserve interleave capability on each card 138, 140 until cachelines in a smallest memory of such card 138, 140 have been exhausted. Additionally, once the bottom card is exhausted of cachelines, addresses continue in cachelines above the mirrored region (e.g., mirrored regions C and D) of the top card 140 until cachelines in the top card 140 are exhausted. Therefore, if a card 138, 140 needs to be powered down (e.g., so that a memory 122, 126, 130, 134 on such card 138, 140 may be replaced) only cachelines above the mirrored region on that card 138, 140 will be written (e.g., paged) to an I/O device 110. Consequently, while such card 138, 140 is replaced, the apparatus 100 may access cachelines on the remaining card 138, 140. If a balanced memory configuration is employed, the apparatus 100 may access approximately half of the total memory 121 while a card 138, 140 is powered down (e.g., so that a memory 122, 126, 130, 134 on such card may be replaced). For the above reasons, employing a memory configuration that employs memory stacking (e.g., a modified memory stacking), memory mirroring and memory interleaving in a total memory 121 may reduce a number of memory entries that are written to an I/O device 110 while a portion of the total memory 121 is replaced.

In step 406, data is stored in the total memory. For example, data is stored in a total memory 121, which is configured as described above. Step 406 is similar to step 206 of the method 200, and therefore, is not described in detail herein.

Thereafter, step 408 is performed. In step 408, the method 400 ends.

Additionally, the apparatus 100 may detect an error in a portion of the total memory 121. For example, during operation, the apparatus 100 may tabulate statistics (e.g., scrub and runtime error statistics) for determining if a memory 122, 126, 130, 134 is faulty such that the memory 122, 126, 130, 134 should be replaced, and detect errors based on such statistics. If the apparatus 100 detects an error in a portion of the total memory 121, a port 114-120 to which the memory (e.g., faulty memory) 122, 126, 130, 134 is connected or ports 114-120 to which a physical card 138, 140 including the memory (e.g., faulty memory) 122, 126, 130, 134 is connected may need to be powered down before such memory 122, 126, 130, 134 may be replaced. However, before any ports 114-120 are powered down, data stored above the mirrored region (e.g., mirrored regions C and D) on the card 138, 140 including the memory 122, 126, 130, 134 may be written (e.g., paged) to an I/O device 110. Cachelines of memories 122, 126, 130, 134 not included in the card 138, 140 do not have to be written to the I/O device 110 while the faulty memory is replaced. Therefore, through use of the method 400, the number of memory entries (e.g., cachelines) that are written to an input/output (I/O) device 110 while a portion of the total memory 121 is replaced is reduced. Consequently, I/O processing, such as, a number of I/O accesses performed (e.g., to access the data paged to the I/O device 110) while the portion of the total memory 121 is replaced may be reduced, and therefore, the method 400 may improve performance (e.g., an efficiency) of the apparatus 100 while the portion of the total memory 121 is replaced. Further, because the number of memory entries that are written to an input/output (I/O) device 110 while a portion of the total memory 121 is replaced is reduced, the number of entries that are written to the memory (e.g., paged back) from the I/O device 110 after the portion of the total memory 121 has been replaced is reduced. Consequently, an overall time required for such replacement is reduced.

The foregoing description discloses only exemplary embodiments of the invention. Modifications of the above disclosed apparatus and methods which fall within the scope of the invention will be readily apparent to those of ordinary skill in the art. For instance, the present invention may reduce or eliminate the need to shutdown the apparatus 100 in order to replace memory. Further, a broader aspect of the present invention provides methods and apparatus for (1) employing memory stacking and memory mirroring in a total memory to reduce a number of memory entries that are written to an input/output (I/O) device while a portion of the total memory is replaced; and (2) storing data in the total memory. Another broader aspect of the present invention provides methods and apparatus for (1) employing memory stacking and memory interleaving in a total memory to reduce a number of memory entries that are written to an input/output (I/O) device while a portion of the total memory is replaced; and (2) storing data in the total memory. In both broader aspects described above, the total memory may include a first plurality of memories coupled to respective memory ports in a first group of memory ports of a memory controller and a second plurality of memories coupled to respective memory ports in a second group of memory ports of the memory controller. The above-described broader aspects may be implemented using a memory configuration similar to those described with reference to FIGS. 3A and 3B, and 5A and 5B. In embodiments above, each illustrated cacheline may actually represent a plurality of cachelines that may be rippled through before an illustrated cacheline from another port is accessed.

In summary, the present invention provides methods and apparatus for at least one of (1) employing memory interleaving in a mirrored portion of memory; (2) employing memory interleaving in a memory stack mode; and (3) employing memory mirroring in a memory stack mode.

Accordingly, while the present invention has been disclosed in connection with exemplary embodiments thereof, it should be understood that other embodiments may fall within the spirit and scope of the invention, as defined by the following claims.

The invention claimed is:

1. A method, comprising:
    employing memory stacking and memory mirroring in a total memory to reduce a number of memory entries that are written to an input/output (I/O) device while a portion of the total memory is replaced; and
    storing data in the total memory;
    wherein the total memory includes a first plurality of memories coupled to respective memory ports in a first group of memory ports of a memory controller and a second plurality of memories coupled to respective memory ports in a second group of memory ports of the memory controller.

2. The method of claim 1 further comprising employing memory interleaving in the total memory.

3. The method of claim 1 further comprising detecting an error in the portion of the total memory.

4. The method of claim 1 wherein employing memory stacking and memory mirroring includes employing memory stacking and memory mirroring in the total memory to reduce a number of I/O accesses while the portion of the total memory is replaced.

5. The method of claim 1 wherein employing memory stacking and memory mirroring includes employing memory stacking and memory mirroring in the total memory to reduce a number of memory entries that are written to the total memory from the I/O device after the portion of the total memory is replaced.

6. A method, comprising:
    storing data in a total memory;
    employing memory stacking and memory mirroring in the total memory; and
    reducing a number of memory entries that are written to an input/output (I/O) device while a portion of the total memory is replaced;
    wherein the total memory includes a first plurality of memories coupled to respective ports in a first group of memory ports of a memory controller and a second plurality of memories coupled to respective memory ports in a second group of memory ports of the memory controller.

7. The method of claim 6 further comprising employing memory interleaving in the total memory.

8. The method of claim 6 wherein reducing a number of memory entries that are written to an I/O device includes reducing a number of I/O accesses while the portion of the total memory is replaced.

9. An apparatus, comprising:
    a processor;
    an input/output (I/O) device;
    a memory controller, coupled to the processor and I/O device, including a first and second group of memory ports; and
    a total memory coupled to the memory controller, wherein the total memory include a first plurality of memories coupled to respective memory ports in the first group and a second plurality of memories coupled to respective memory ports in the second group;
    wherein the apparatus is adapted to:
        employ memory stacking and memory interleaving in the total memory to reduce a number of memory entries that are written to the input/output (I/O) device while a portion of the total memory is replaced; and
        store data in the total memory.

10. The apparatus of claim 9 wherein the apparatus is further adapted to employ memory mirroring in the total memory.

11. The apparatus of claim 9 wherein the apparatus is further adapted to detect an error in the portion of the total memory.

12. The apparatus of claim 9 wherein the apparatus is further adapted to employ memory stacking and memory interleaving in the total memory to reduce a number of I/O accesses while the portion of the total memory is replaced.

13. The apparatus of claim 9 wherein the apparatus is further adapted to employ memory stacking and memory interleaving in the total memory to reduce a number of memory entries that are written to the total memory from the I/O device after the portion of the total memory is replaced.

* * * * *